No. 758,126. PATENTED APR. 26, 1904.
H. A. BIENHOFF.
CART.
APPLICATION FILED JULY 30, 1903.
NO MODEL.
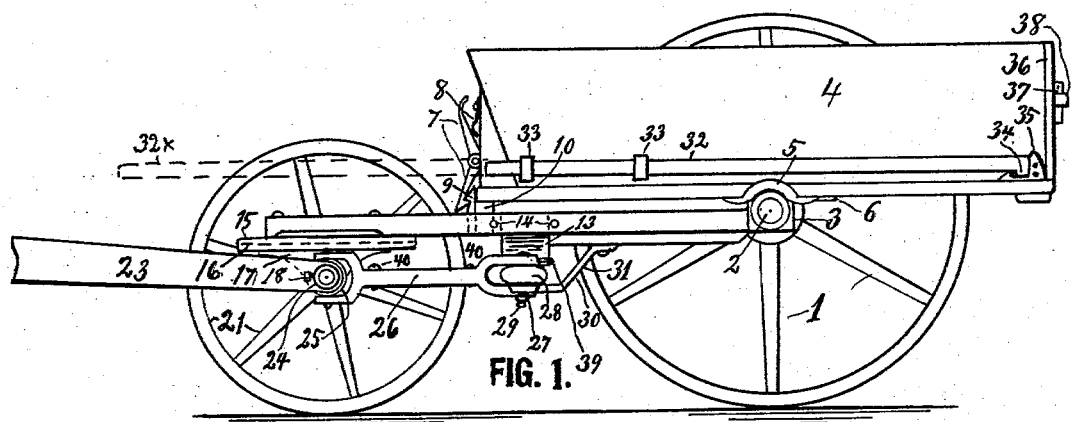
FIG. 1.
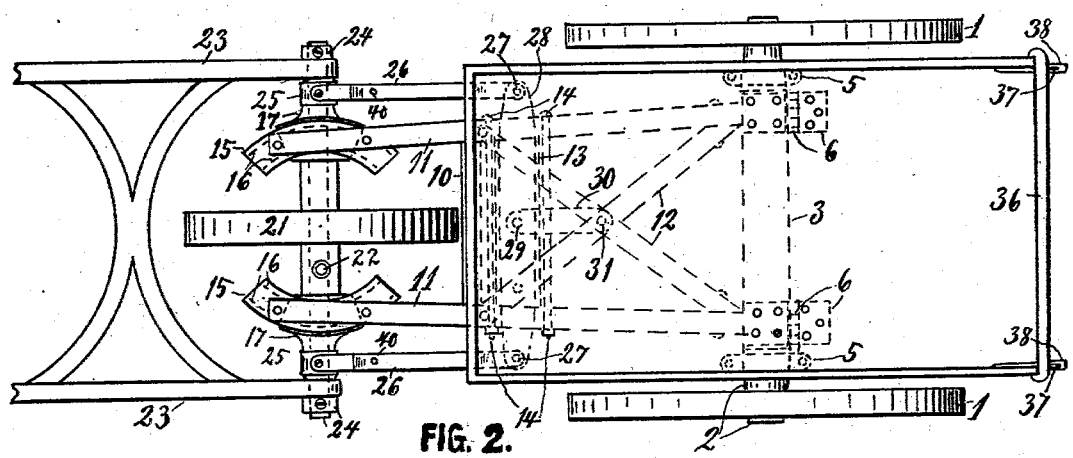
FIG. 2.
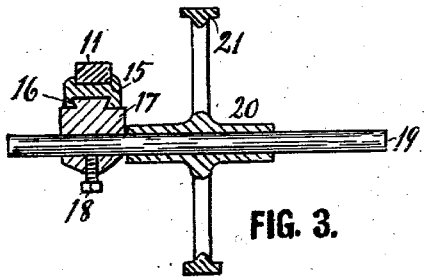
FIG. 3.
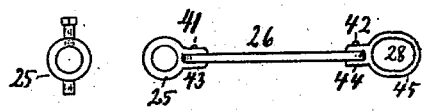
FIG. 4. FIG. 5.
WITNESSES:
D. E. Carlsen
E. C. Carlsen
INVENTOR.
Henry A. Bienhoff
BY his ATTORNEY.
A. M. Carlsen.

No. 758,126. Patented April 26, 1904.

UNITED STATES PATENT OFFICE.

HENRY A. BIENHOFF, OF ST. PAUL, MINNESOTA.

CART.

SPECIFICATION forming part of Letters Patent No. 758,126, dated April 26, 1904.

Application filed July 30, 1903. Serial No. 167,546. (No model.)

*To all whom it may concern:*

Be it known that I, HENRY A. BIENHOFF, a citizen of the United States, residing at St. Paul, in the county of Ramsey and State of Minnesota, have invented certain new and useful Improvements in Carts; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in carts; and the main object of the invention is to provide a novel, convenient, and easily-operated three-wheeled horse-cart, which may also be used as a dump-cart. This and other objects I attain by the novel construction and arrangement of parts illustrated in the accompanying drawings, in which—

Figure 1 is a side elevation of my cart with one of the side wheels removed. Fig. 2 is a top or plan view of the cart in Fig. 1 with the box-latch 7 and lever 32 omitted, but both side wheels shown. Fig. 3 is a vertical diametrical section through the single front wheel and a few of the adjacent parts. Fig. 4 is a detail view of the collar 25, and Fig. 5 is a modification of the rod 26 and its end connection.

Referring to the drawings by reference-numerals, 1 designates side wheels which are journaled on the skeins 2 of the axle 3, on which the box 4 is supported by segmentally-curved castings 5, secured under the box and fitting upon the upper side of the skeins. In this position the box is held by the hinges 6, secured under its bottom and upon the axle 3, except while the box is being tilted backward to dump a load, when the box is for a few moments supported by the hinges only. The portion of the box forward of the hinges is slightly longer than the part back of the hinges, so as to prevent all tendency to accidental raising of the front end of the box or of the entire cart, and to prevent tilting of the box from a sudden jerk there is pivoted at the front end of the box a hook or latch 7, which by the spring 8 is held in engagement with the hook 9, fixed to the cross-bar 10 or any other suitable part of the framework.

From the main axle 3 extend forward a pair of hounds 11, braced by the diagonally-crossed bars 12 and by the cross-bar 13 and bolts 14, one at each side of same, and may also have the bar 10. The front ends of the hounds are secured upon segmental castings 15, dovetailed at 16 to slide on the casting 17, in which is secured by set-screws 18 the front axle 19 of the cart. Upon the middle of this axle 19 is journaled the sleeve-like hub 20 of the front wheel 21. 22 is an oil-cup on said hub to lubricate it on the axle.

23 represents the shafts or thills of the cart. These are held upon the ends of the front axle between the collars 24 25. To the last-named collars are pivoted the rods 26, of which the rear ends are pivoted at 27 near the outer ends of a beam or lever 28, which is fulcrumed at the middle on the king-bolt 29, secured in the cross-bar 13 and having its lower end secured by the brace 30 to the bolt 31 in the crossing of the frame-bars 12.

32 is a bar or lever sliding in the keepers 33, secured upon the side of the box, though it may as well be under the box. This lever is held in its normal place by having a small hook 34 resting in a suitable keeper 35, secured upon the box.

36 is the regular end-gate of the box. It may be held shut by keys 37 through projections 38 or by any other suitable means.

In the use and operation of the cart it will be understood that the cart need not in all cases have a box adapted to be tilted so as to dump the load; but when such box is used the operator in dumping the load removes or opens the end-gate, and if the load is heavy he pulls the lever 32 forward, as shown in dotted line 32$^\times$, and after opening the latch 7 by pressing near its upper end he uses the lever in tilting the box rearward, so as to dump the load, and bringing the box back to its normal position the latch 7 interlocks itself with hook 9. The lever and end-gate are then placed in normal position.

In driving the cart over uneven ground there is no such twisting of the framework as in a four-wheeled vehicle when one wheel is raised or lowered, nor is there any side draft or jerks to the horse from obstructions to one of the front wheels. The single front wheel enables the animal to steer the vehicle with the utmost ease. And as for strength it will be observed that the pull is by the rods 26, beam or whiffletree 28, bolts 29 31, and brace 30, carried to the strongest parts of the frame and to the hind wheels, so that the front wheel and front parts of the hounds are not subjected to the pulling strain drawing the load, but are mostly for steering, guiding, and supporting the front end of the cart, and thus, among other advantages, relieve the horse of the usual burden it must carry and jerks it must suffer in drawing the common two-wheeled carts heretofore used, or even the four-wheeled vehicles.

It will be understood that 39 in Fig. 1 represents the common whiffletree-plates used in vehicles as a cheap or substitute fifth-wheel.

In Fig. 4 it is shown that the collar 25 may have screws, as at the upper side, or studs, as at the lower side, for the reception of the rod 26, which may be cheaply made from two strips of flat bar-iron and secured together by rivets or screws 40.

In Fig. 5 is shown how the rod 26 may be a plain single bar of flat iron pivoted at 41 42 to or between ears 43 of the ring 25 and 44 of a ring 45, securable upon the end of the beam or whiffletree 28; but as this will not bring the pivots in the rods 26 into line with the axle 24 and the king-bolt 29 the front wheel and its segmental bearings will not work as smoothly as in the arrangement shown in Figs. 1 and 2. I therefore prefer the latter form, at least in good grades of carts.

Having thus described my invention, what I claim, and desire to secure by Letters Patent, is—

1. A cart having one supporting-wheel at each side and one supporting-wheel in the front part of the framework, a whiffletree pivoted to the framework rearward of the front wheel, rods or links connecting the ends of the whiffletree with the ends of the axle of the front wheel, shafts or thills also connected with the front axle and segmental intermeshing guides secured on the framework and on the axle at both sides of the front wheel.

2. A dumping-cart having its box hinged on its main axle and being heaviest in front of the hinging-point, and a sliding bar carried in guiding-keepers upon the side of the box in such a manner that it may be extended beyond one end of the box and used as a lever in dumping the load and means to prevent accidental sliding of the bar when not in use.

3. A dumping-cart having its box hinged to the main axle, and the guiding-irons 5 fitting the upper rounding of the skeins when the box is in its normal position.

4. In a cart of the class described, the combination with a pair of carrier-wheels and an axle in same, of a pair of hounds extending forward from said axle and having secured to their front ends dovetailed segmental plates 15, segmental bearings 17 fitting in the dovetailing, an axle secured in the bearings, a single supporting-wheel journaled upon the axle between the hounds, suitable means for hitching a horse to the front axle, a cross-bar between the hounds, braces 12 in rear thereof, a whiffletree pivoted to the cross-bar, and rods connecting its ends with the ends of the front axle.

5. In a cart of the class described, the combination with a pair of carrier-wheels and an axle in same, of a pair of hounds extending forward from said axle and having secured to their front ends dovetailed segmental plates 15, segmental bearings 17 fitting in the dovetailing, an axle secured in the bearings, a single supporting-wheel journaled upon the axle between the hounds, suitable means for hitching a horse to the front axle, a cross-bar between the hounds, braces 12 in rear thereof, a whiffletree pivoted to the cross-bar, and rods connecting its ends with the ends of the front axle, and the brace 31 connecting the king-bolt of the whiffletree with the crossing of the braces 12, substantially as and for the purpose set forth.

In testimony whereof I affix my signature in presence of two witnesses.

HENRY A. BIENHOFF.

Witnesses:
B. BIENHOFF,
CHARLES STEES.